United States Patent [19]

Cretin et al.

[11] Patent Number: 5,339,669
[45] Date of Patent: Aug. 23, 1994

[54] APPARATUS AND PROCESS PERMITTING THE COLD FORMING OF GROOVES ON THE WALL OF A REVOLVING PART

[75] Inventors: Michel Cretin, Etaule-Mellecey; Jean-Paul Lespour, Gigny; Charles Marcon, Chagny, both of France

[73] Assignee: Escofier Technologie S.A., Chalon-Sur-Saone, France

[21] Appl. No.: 956,508
[22] PCT Filed: May 21, 1992
[86] PCT No.: PCT/FR92/00452
  § 371 Date: Jan. 21, 1993
  § 102(e) Date: Jan. 21, 1993
[87] PCT Pub. No.: WO92/20474
  PCT Pub. Date: Nov. 26, 1992

[30] Foreign Application Priority Data

May 23, 1991 [FR] France .................. 9106619

[51] Int. Cl.$^5$ .............................. B21H 5/02
[52] U.S. Cl. .............................. 72/108
[58] Field of Search ............ 72/108, 195; 464/160

[56] References Cited

U.S. PATENT DOCUMENTS

| | | | |
|---|---|---|---|
| 1,463,171 | 7/1923 | Mead | 464/160 |
| 2,883,894 | 4/1959 | Tsuchikawa | 72/105 |
| 2,906,147 | 9/1959 | Pelphrey | 72/105 |
| 3,552,167 | 1/1971 | Bergi et al. | 72/108 |
| 3,675,454 | 7/1972 | Pratt | 72/108 |
| 4,677,836 | 7/1987 | Anderson et al. | |

FOREIGN PATENT DOCUMENTS

| | | |
|---|---|---|
| 0259508 | 3/1988 | European Pat. Off. |
| 915328 | 7/1954 | Fed. Rep. of Germany . |
| 1552194 | 12/1970 | Fed. Rep. of Germany . |
| 3149633 | 8/1982 | Fed. Rep. of Germany . |
| 3711927 | 10/1988 | Fed. Rep. of Germany . |
| 1148950 | 7/1957 | France . |
| 1562283 | 4/1969 | France . |
| 28330 | 2/1947 | Luxembourg . |
| 30467 | 12/1951 | Luxembourg . |
| 732062 | 5/1980 | U.S.S.R. . |
| 1384387 | 2/1975 | United Kingdom . |
| 1384388 | 2/1975 | United Kingdom . |

OTHER PUBLICATIONS

Patent Abstracts of Japan, vol. 9, No. 172 (M-397) (1895), Jul. 17, 1985 & JP-A-60 44220, Mar. 9, 1985.
Werkstatt und Betrieb, vol. 103, No. 7, 1970, pp. 507–515, H. Loos, "Zahnrad-Rollen".
Machine Design, vol. 41, No. 9, Apr. 17, 1969, pp. 233–238, F. J. Lavoie, "Roll–Forming Gears".

*Primary Examiner*—Lowell A. Larson
*Attorney, Agent, or Firm*—Oblon, Spivak, McClelland, Maier & Neustadt

[57] ABSTRACT

The apparatus and process according to the invention relate to the cold forming by rolling of revolving parts (7).

The apparatus comprises two identical milling wheels (9A, 9B) arranged symmetrically with respect to the part (7) to be formed and performing the same rotation movement at speed Vm and progressively moving towards the axis of the part to be formed (X1—X1). The part (7) performs a rotation movement at speed Vp such that $Vp = Vm \cdot N1/N2$, N1 being the number of grooves on each wheel (9A, 9B), N2 the number of grooves to be formed on the part (7). An initial setting makes it possible to bring about coincidence between the grooves formed by each of the milling wheels on the part (7).

The apparatus and process make it possible to obtain high precision parts.

17 Claims, 5 Drawing Sheets

APPARATUS AND PROCESS PERMITTING THE COLD FORMING OF GROOVES ON THE WALL OF A REVOLVING PART

BACKGROUND OF THE INVENTION

The apparatus and process according to the invention relate to the cold forming of grooves on the revolving wall of a part by means of a pair of rotated knurling or milling wheels or rolls. These milling wheels have straight or inclined grooves on their peripheral wall, which are made to bear against the wall of the part, so that, by rolling, the wall undergoes a plastic deformation and in this way the corresponding grooves are obtained. The term rolling is generally understood to mean the application of a force to the rotating milling wheels, said wheels and their grooves sandwiching the revolving part on which forming is to take place, the part being rotated by friction with the milling wheels and their grooves. In general terms the grooves which it is proposed to produce thus make it possible to obtain shafts with parallel grooves or pinions having straight or inclined tooth systems, or threads for all types of applications.

Apparatuses or processes making it possible to obtain such grooves by rolling are already known. The GROB French patent 2 408 408 describes a process and an apparatus for forming by cold milling or knurling a tooth system on a cylindrical part rotating freely on a machine frame. This process relates to a machine of the type operating in remote manner between fixed axes, i.e. a machine whereof the axes of the shafts 8, 8' supporting the forming milling wheels 9, 9' are maintained at a constant equal distance from the axis of the revolving part to be formed throughout the forming operation. The two milling wheels 9, 9' have increasing radial tooth heights in the rotation direction so as to progressively penetrate the part 28. As has been explained in the above document, the teeth are produced in less than a revolution of the milling wheels, because the tooth profile of said wheels is evolutive. It is necessary to carry out a very precise angular keying or wedging of the milling wheels with respect to one another, so that the teeth of each wheel, during the rotation of the part, very accurately engage in the cavities formed by the teeth of the milling wheel located on the other side of the part.

This document describes means making it possible to obtain precision parts. It insists on the necessity of effectively keying the means supporting the bearings of the shaft, which drive the forming milling wheels 9, 9'. Such a keying or wedging by means of wedges or keys 15, 15' locked by screws 16, 16' bears on the frame of the machine 1. The synchronization of the shafts 8, 8' carrying the milling wheels is ensured by a pinion 21, which meshes on two other pinions 17, 17', each integral with one of the two shafts. A very precise angular keying of the milling wheels on the shafts has to be performed. The driving of the shafts of the milling wheels is brought about by two electric motors. A connection by articulated shafts 7, 7', provided with universal joints and sliding elements (not shown) makes it possible to adjust the distance between the milling wheel-holding shafts 8, 8', when this proves necessary.

Although this is not pointed out in the document, the remote forming apparatuses with a fixed centre-to-centre distance do not make it possible to produce precision parts, except when high quality evolutive profile milling wheels are used and which have a costly construction. The precise fitting of these milling wheels is relatively difficult and it is necessary to have a very considerable rigidity of the means supporting the shaft bearings, as well as the machine frame. Finally, these machines do not make it possible in general, to produce anything other than small parts. Thus, the necessity of having to produce the parts in less than one revolution of the milling wheel limits possibilities with regards to the production of larger parts.

Another process for the cold forming of grooves on the revolving wall of a part consists of using milling wheels having grooves or teeth with a constant profile instead of wheels having grooves or teeth with an evolutive profile. The penetration of the grooves or teeth of these milling wheels, with a constant profile and therefore a constant radial height, in the revolving wall of the part to be formed is brought about by the progressive reduction of the distance between the axes of a pair of milling wheels, rotating on shafts and between which is placed the revolving part to be formed.

The CHURCHILL German patent application 2025659 describes a device having two milling wheels 1, 2 mounted on shafts resting on fixed bearings at the front of two carriages 11, 12 able to slide on slides in order to very the distance between the axes of the milling wheel-holding shafts 1, 2 with a view to bringing the forming profiles thereof into contact with the revolving wall of the part 3 to be formed.

The moving together of the two carriages 11, 12, along an axis perpendicular to that of the part 3 to be formed, is brought about by two parallel jacks, whose cylinders 4, 5 are respectively located in the carriages 11, 12, whilst the heads of the pistons 6, 7 are fixed at the front of the opposite carriages 12, 11. Slides 8, 9 enable the two carriages to slide parallel to one another, so that the constant profile milling wheels 1, 2 come into contact with the part 3 to be formed. The penetration depth is controlled by means of abutments 26, 27 and their degree of screwing on the piston 6, 7 is adjusted. Thus, there is a limitation to the advance of the two carriages towards one another and therefore of the penetration depth of the profiles of the milling wheels in the wall of the part to be formed. It is also stated that it is possible to facilitate the engagement of the teeth of the milling wheels 1, 2 in the wall of the part 3 to be formed, by rotating said part 3 prior to the engagement of the milling wheels. It is also possible on the entire circumference of the part to form incipient grooves, e.g. by milling, so as to in some way guide the penetration of the teeth of the milling wheels 1, 2 in the wall of the part 3.

The SOUTHWESTERN INDUSTRIES INC French patent 2242174 also describes a method for forming grooves on revolving parts, by means of at least one milling wheel having a constant profile tooth system. The milling wheel is made to roll on the wall of the part, with a view to reproducing thereon the milling wheel tooth profile. In this method, at the time of contact between the toothed forming edge of the milling wheel and the wall of the part, the pressure exerted by the milling wheel must just be sufficient to rotate the part, whilst only marking thereon a line of the contour of said forming milling wheel. According to this patent, there is no need to simultaneously rotate the forming milling wheel or wheels on the one hand and the part to be formed on the other. It is merely necessary to rotate either the part to be formed, or the forming milling wheels. The initial pressure exerted by the wheel or wheels on the part during the rolling operation must be sufficient to rotate the part to be formed or the wheels if one or other thereof is free. This initial pressure must consequently be sufficient to rotate the part to be formed or the forming milling wheels without any relative sliding, for several wheel rotations, the final fixing only being subsequently obtained.

Although the aforementioned documents do not provide numerical examples, it is known that the cold forming of teeth or grooves on the wall of revolving parts by rolling by means of evolutive profile milling wheels gives better results with respect to the accuracy of the products obtained. This is explained by the use of a fixed centre-to-centre distance and an effective keying of the structure supporting the bearings of the milling wheels against a very rigid frame. The machines of this type are expensive in view of their very complicated, large structures and they are suitable for the production of large numbers of small parts. The considerable ratio which must exist between the diameter of evolutive profile milling wheels and that of the parts is also a factor opposing the construction of large parts by means of such apparatuses.

Apparatuses making it possible to cold form grooves or teeth by means of constant profile milling wheels have a much greater flexibility of use. Constant profile wheels are much less expensive to manufacture than evolutive profile wheels. The possibility of making their teeth or grooves penetrate the revolving wall of the part to be formed, whilst progressively decreasing the distance between the axes, makes it possible to very considerably reduce the pressure exerted. The same deformation work is carried out in a longer time during several revolutions of the milling wheels instead of less than a complete revolution. However, the displacement perpendicular to their axis of the milling wheel-holding shafts in order to move the wheels towards the part to be formed is an imprecision factor, which is added to the others and contributes to the obtaining of less accurate results. In the same way, the conditions under which the milling wheels come into contact with the part to be formed are less well defined.

SUMMARY OF THE INVENTION

Consideration has been given to the possibility of obviating the disadvantages of apparatuses for the cold forming of teeth or grooves using constant profile milling wheels, applied to the revolving wall of a part to be formed by rolling, by a process utilizing the variation of the distance between the axes. More specifically, investigations have taken place of the possibility of developing an apparatus permitting the carrying out of a process by which it is possible to produce toothed or grooved parts having the same precision as those obtained by means of apparatuses using evolutive profile milling wheels and carrying out the rolling of the part to be formed with a constant distance between the axes of the milling wheels.

The apparatus and process according to the invention make it possible to achieve these results. This apparatus and this process make it possible to obtain by cold forming using constant profile milling wheels applied by rolling to the revolving wall of a part, teeth or grooves regularly distributed in equidistant manner. These teeth or grooves can be parallel to the axis of the part or inclined by a random angle with respect thereto. The profiles of teeth or grooves can vary within wide limits, as a function of the particular uses. For example, these teeth or grooves can be given an adequate inclination to produce threads. The apparatus according to the invention comprises two identical forming milling wheels, whose periphery has a same constant profile forming tooth system distributed over 360°. During fitting to their respective shaft, each of the two milling wheels is keyed in rotation in a given angular position and their axes are arranged symmetrically to the axis of the revolving part to be formed. Driving and synchronizing means make it possible to rotate the two shafts at an equal instantaneous speed and means for regulating the angular position of one milling wheel-holding shaft with respect to the other also make it possible to bring about coincidence between the marking made on the wall of the part to be formed by the teeth or grooves of one wheel with that made by the teeth or grooves of the other.

Advance means make it possible to reduce the distance between the axes of the two milling wheel-holding shafts, in order to bring about contact between the forming profiles of the wheels and the revolving wall of the part to be formed, thus bringing about an initial marking on the part, as indicated hereinbefore. The advance is then continued up to a given distance corresponding to the desired penetration depth of the wheels in the part wall.

According to the invention, the apparatus has a means for rotating the part to be formed making it possible to give it an instantaneous rotation speed Vp equal to the instantaneous rotation speed of the milling wheels Vm multiplied by the ratio N1/N2, N1 being the number of teeth of each milling wheel and N2 the number of teeth to be formed on the part.

According to the process of the invention, rotation takes place at speed Vp of the part to be formed by rolling, prior to contacting between the wheels and the wall of the part to be formed and said rotation speed is maintained throughout all or part of the advance movement of the milling wheels reducing the distance between the axes of the two wheel-holding shafts. The instantaneous speeds Vm and Vp can be constant throughout the forming of the part or can vary during said forming, as a function of the penetration of the wheels in the part to be formed.

Preferably, a disengaging means makes it possible to interrupt the connection between the means rotating the part and the latter. This interruption preferably takes place before increasing the distance between the axes of the milling wheel-holding shafts after completing the penetration of the teeth or grooves of the wheels in the peripheral wall of the part, if said interruption has not taken place beforehand.

The angular keying or wedging of each milling wheel on the wheel-holding shaft rotating it takes place with great accuracy, preferably by means of a frontal tooth system, which engages, by axial pressure or thrust, with a corresponding tooth system integral with the shaft. Advantageously, said angular keying is brought about by means of two rings or bushes. Each of the latter has a frontal edge on which is located a ring of teeth or grooves, oriented from the inside to the outside, either radially or with a certain conicity. The two toothed or grooved rings are provided to fit into one another with a minimum clearance. One of the two bushes is integral with the milling wheel, e.g. by screwing on a front face thereof and the other is integral with the wheel-holding shaft, e.g. by screwing to a shoulder thereof.

Obviously, the power levels provided by the driving means for the milling wheels and the part ensuring the movements according to the invention must be adequate to ensure the operating stability in accordance with the requisite speed ratio during the forming of the part.

According to a special embodiment, the two milling wheel-holding shafts are rotated by a single motor, which drives the main shafts of the two reducing gears, whose layshafts are connected, each by an articulated connection or coupling, to the corresponding wheel-holding shaft. In a particularly advantageous manner, a keying differential gear is intercalated between the main shaft of one of the two reducing gears and the main shaft connected to the motor, which also drives the other reducing gear. As these two reducing gears have the same reduction ratio, they drive their layshafts at the same speed. The input and output shafts of the keying differential gear have the same rotation speed and only their angular keying can be modified by modifying the angular position of the external ring of the planetary system constituting the keying differential gear. A control shaft which can be driven by a motor makes it possible to modify said angular keying in one direction or the other.

Preferably, the drive motor has a means for regulating and controlling its rotation speed making it possible to adjust the same in an accurate manner. This means can comprise a gear changer. The articulated connection between the layshaft of each of the reducing gears and the wheel-holding shaft corresponding thereto is preferably constituted by a telescopic shaft, whereof the two components sliding in one another are locked in rotation relative to one another e.g. by grooves. This telescopic shaft is connected to the layshaft of the reducing gear and to the wheel-holding shaft by articulated joints such as universal joints.

In place of a single drive motor, it would be possible to use two motors, each driving a reducing gear. Preferably, there is a mechanical synchronization connection between the shafts of these motors in order to ensure synchronization. This connection is preferably brought about by a keying differential gear located between the extensions of the main shafts of the two reducing gears, so as to easily obtain the relative angular keying of the milling wheels.

The driving means for each milling wheel-holding shaft can also be constituted by an independent motor, the synchronization of the speeds of the two shafts and the regulation of the angular keying of one of the shafts with respect to the other being obtained by a per se known, special electronics connecting and controlling the two motors.

The part to be formed can be rotated by the shaft which supports it and which is itself driven by a mechanical transmission, a power take-off being effected on the motor means driving the wheel-holding shafts. A speed regulating means such as a gear changer or a gearbox with multiple, adaptable ratios is interposed in order to be able to make it possible to adjust the rotation speed of the part to be formed to the desired value.

The part to be formed can also be driven by an independent motor, which rotates the shaft on which it is mounted by means of means for regulating and controlling the speed and transmission. These speed regulating and control means are such that they make it possible to obtain the rotation speed $V_p$ of the part to be formed, as a function of the rotation speed $V_m$ of the milling wheels in order to satisfy the relation $V_p = V_m \cdot N_1/N_2$.

Advantageously, the motor means rotating the forming milling wheels at the same instantaneous speed $V_m$ have gear changers, whose operation is controlled by control means, so as to automatically control the speed $V_m$ and maintain it at a constant value when this proves necessary. In a particularly advantageous manner, the motor means rotating the part to be formed has a gear changer, whose operation is controlled by control means making it possible to control the instantaneous speed $V_p$ in such a way that it satisfies the relation $V_p = V_m \cdot N_1/N_2$.

Each of the milling wheel shafts is advantageously provided with per se known shaft brakes, which make it possible to take up the possible rotation clearances existing in the gearing chain of the movement with respect to said milling wheel shafts and to bring about bearing of the tools with respect to their rotation direction. These brakes can be remotely controlled and may or may not be used as a function of the desired precision. The said brakes make it possible to operate with maximum precision, particularly on starting up the forming of the parts. Advantageously, whilst maintaining the instantaneous speed of the part according to the invention, the shaft of each of the milling wheels is also provided with orientation means making it possible to incline the axis of said shaft in a plane perpendicular to the displacement axis of the milling wheel in the direction of the part to be formed. For certain applications, there is also a means making it possible to incline the axis of the wheel-holding shaft with respect to the axis of the part in the plane containing said latter axis and which is parallel to the displacement axis of the wheel. These orientation means are known per se and can be constituted conventionally e.g. by plates orientable with 2° of freedom. In this case the instantaneous speed of the milling wheels is not necessarily constant, but the two wheels have an identical instantaneous speed. Such orientation means make it possible to ensure the forming of parts which are not cylindrical, e.g. conical revolving parts.

Each of the milling wheel shafts is preferably mounted by its bearings on a carriage sliding on slides integral with the basic structure of the apparatus and perpendicular to the axis of the part to be formed. At least one hydraulic jack is e.g. positioned below the carriages and by means of its piston rod exerts in a direct or indirect manner the torsional stress bringing about the advance of the two carriages towards one another with a relative movement in order to reduce the centre-to-centre distance and bring about the contact of each milling wheel with the revolving wall of the part to be formed.

The advance of the carriages can take place symmetrically, the axis of the part to be formed remaining fixed. This advance can also be carried out in a relative manner, one of the two carriages remaining fixed with respect to the basic structure, the axis of the part then moving at the same time as the mobile carriage, at a given speed, so that it remains at mid-distance of the two axes of the milling wheel-holding shafts. The symmetrical advance of the two carriages can in particular be brought about by means of the device described in FR 1490722, which synchronizes the action of a hydraulic jack. The return of the carriages to the initial position takes place in identical manner.

Advantageously, a programming means makes it possible to determine the advance conditions of the carriages as a function of the dimensions of the milling wheels and the parts, as well as those of the teeth or grooves. Abutment means make it possible to adjustably limit the advance of the carriages.

Advantageously, a translation means makes it possible to relatively displace the part during forming along its axis with respect to the milling wheels in order to produce teeth or grooves on a length exceeding that of the milling wheels by the per se known successive rolling method. This operation is advantageously preceded by a forming start with an approach of the wheels in the direction of the part and engagement of the teeth or groove to the intended working depth. The successive displacement, combined with the rolling, then takes place at a constant depth. In known manner, the profile of each tooth or groove of the milling wheels varies from one end to the other so as to permit the forming by said successive working method. The advance of the part can also result from an inclination of the axis of the milling wheels relative to the axis of the part, as explained hereinbefore.

Advantageously, the part-holding shaft and its driving means comprise a motor and transmission means and are fixed to a gantry mounted on the basic structure of the apparatus. This gantry is articulated so as to make it possible to remove the assembly comprising the shaft holding the part to be formed and its driving means from the narrow space between the two wheel-holding shafts, so as to give direct access for part or milling wheel changes and for all interventions necessary on the different shaft lines. Such an apparatus also makes it possible to work without driving the part, i.e. a conventional rolling operation, so that a polyvalent apparatus is provided. According to a special embodiment of the gantry, the latter has slides, arranged parallel to the axis of the part-holding shaft and on which slides the part-holding shaft and the driving means for the same, e.g. mounted on a carriage. A controlled speed translation means makes it possible to slide the carriage on said slides. Said means can be an e.g. hydraulic motor, which drives a pinion meshing on a rack. Thus, it is possible to form grooves or teeth on parts, by successive rolling, in the manner described hereinbefore, the part rotation movement being combined with a sliding of the part to be formed along its axis.

Obviously the installation of the shaft holding the part to be formed and its driving means can take place other than with a gantry. Even when there is no gantry, the apparatus advantageously has a means for giving the part a translation parallel to its axis.

As a variant for the performance of the process according to the invention, it is possible to use as blanks revolving parts, whereof at least one of the ends has, in the zone corresponding during forming to the action zone of the edge of the milling wheel along its axis, a slight annular shoulder. The dimensions of this annular shoulder would advantageously correspond to a radial extra thickness between 0.2 and 0.7 mm and to a total axial extension between 1 and 5 mm, whereby the shoulder can e.g. be triangular or rectangular.

Such a shoulder facilitates the forming of the part at the start of the penetration of the grooves or teeth of the milling wheels in the part and aids the stability of the rotation speed of the part Vp.

BRIEF DESCRIPTION OF THE DRAWINGS

The example and the figures hereinafter describe in a non-limitative way particular embodiments of the apparatus and particular embodiments of the process along the invention.

DESCRIPTION OF THE PREFERRED EMBODIMENTS

Figure 1:
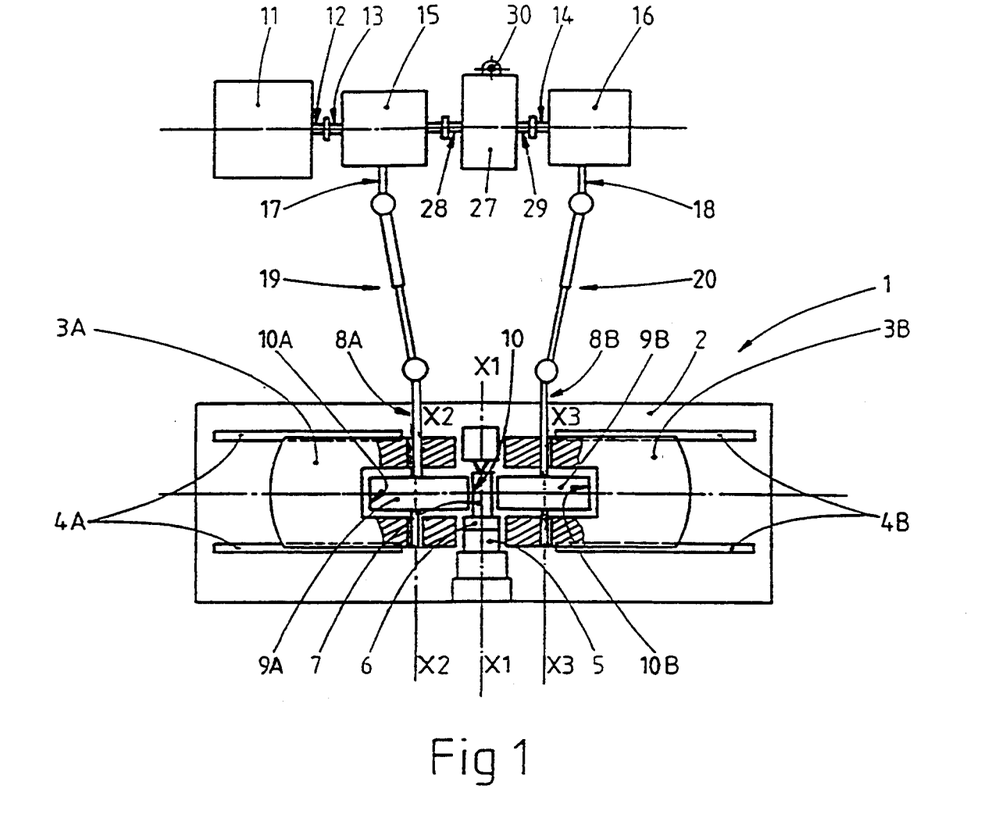
FIG. 1 A diagrammatic plan view of the cold forming apparatus according to the invention and its drive means.

FIG. 1 is a diagrammatic plan view showing an apparatus having the means according to the invention and permitting the performance of the process according to the invention.

The apparatus 1 according to the invention comprises a basic structure 2 on which are placed two carriages 3A, 3B able to slide on slides 4A, 4B perpendicular to the axis X1—X1 of the part-holding shaft 5. The latter has a fixing head 6 for the revolving part 7 to be formed. This fixing head is equipped with not shown jaws, whose hydraulic closing is controlled by known, not shown means. The motor means ensuring the regulation and control of the rotation speed of the part-holding shaft 5 are positioned above the latter and are not visible in this diagrammatic view.

The milling wheel-holding support shafts 8A, 8B have shaft brakes and are mounted on bearings respectively fixed to the front faces of the carriages 3A, 3B. The identical constant profile milling wheels 9A, 9B are mounted on shafts 8A, 8B, so as to be rotated about axes X2—X2 and X3—X3 in the same direction. Thus, the advance of the carriage 3A, 3B along the slides 4A, 4B in the direction of perpendicular to the axis X1—X1 enables the milling wheels 9A, 9B to come into contact with the revolving wall 10 of the part 7 and to form thereon, by rolling, a profile corresponding to the constant profile of the peripheral surfaces 10A, 10B of said wheels.

Figure 2:
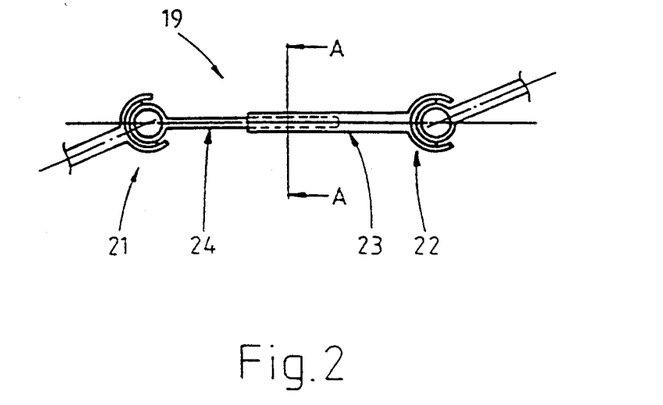
FIG. 2 A larger-scale view of an articulated transmission shaft of FIG. 1.
Figure 3:
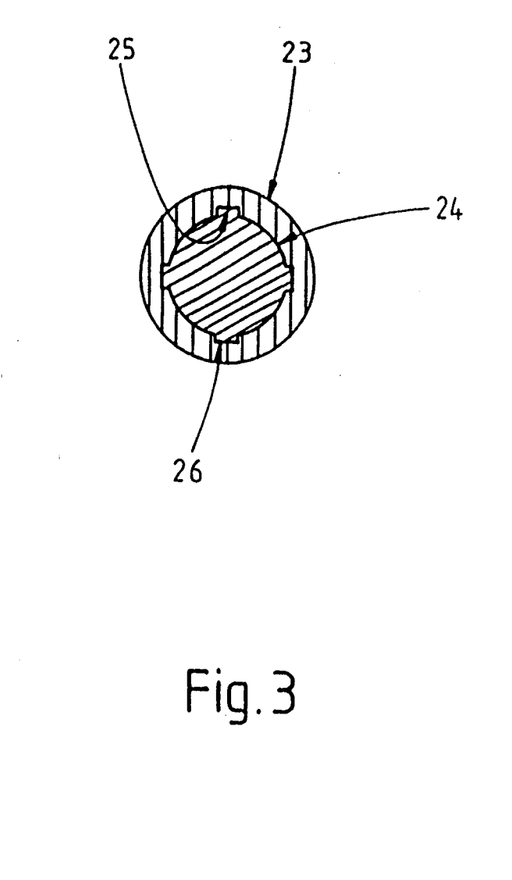
FIG. 3 A section along A—A of FIG. 2 on a much larger scale.

As shown in FIG. 1, the wheel-holding shafts 8A, 8B are driven by a single motor 11, whose shaft 12 drives the main shafts 13, 14 of the reducing gears 15, 16. The latter in turn drive by their layshafts 17, 18 articulated telescopic shafts 19, 20, which are connected to the wheel-holding shafts 8A, 8B. As shown in FIG. 2, each of the telescopic shafts such as 19 has two sections 23, 24 sliding in one another, whilst being keyed in rotation with respect to one another, as is shown by the greatly increased scale section A—A in FIG. 3. This keying is brought about by longitudinal grooves in relief such as 25, which engage in sunken grooves such as 26. Generally the number of grooves such as 25/26 is larger than appears in the purely diagrammatic FIG. 3. At the two ends of each of the two shafts, universal joints such as 21, 22 ensure the connection with the corresponding shafts 17, 8A or 18, 8B, the layshafts 17, 18 being parallel to the milling wheel-holding shafts 8A, 8B, in order to give the shafts 8A, 8B a regular speed.

Figure 8:
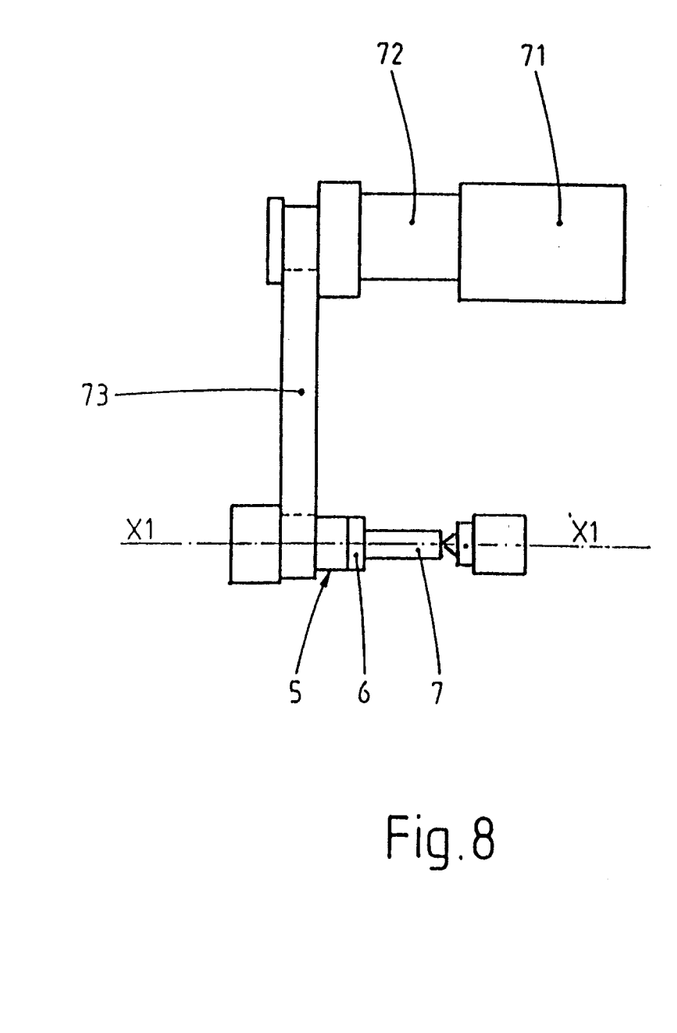
FIG. 8 An elevation of the part-holding shaft of the apparatus according to the invention and its drive means.

In order to adjust the angular keying of the milling wheels 9A, 9B, the main shafts 13, 14 driving the reducing gears 15, 16 are connected to one another by a keying differential gear 27, whose input 28 and output 29 shafts have a speed ratio equal to unity. A control shaft 30, which varies the angular position of the external ring of this known planetary differential gear makes it possible to modify the angular keying of one of the wheel-holding shafts with respect to the other. Therefore this differential gear makes it possible to adjust the initial angular keying before the start of the rolling operation of the milling wheels 9A, 9B, so that they successively penetrate the same lines formed by the preceding milling wheel, provided that the part is rotated at the desired speed. For this purpose, the part to be formed 7 is driven by a motor means 71 (cf. FIG. 8) associated with a reducing gear 72, as well as transmission means, e.g. by a notched belt 73, said means being positioned above the part-holding shaft 5 and supported in not shown manner by a not shown gantry (cf. FIG. 9). The regulation of the speed can take place in known manner by a speed changer and a specific not shown computer allocated to the motor means 71. These drive and regulating means make it possible to give the part-holding shaft an instantaneous rotation speed $V_p$ equal to the instantaneous speed $V_m$ of each of the milling wheel holders multiplied by the ratio $N_1/N_2$, $N_1$ being the number of teeth or grooves of each wheel and $N_2$ the number of teeth or grooves which it is intended to produce on the part, whilst taking account of the diameter of the part and the wheel.

Figure 4:
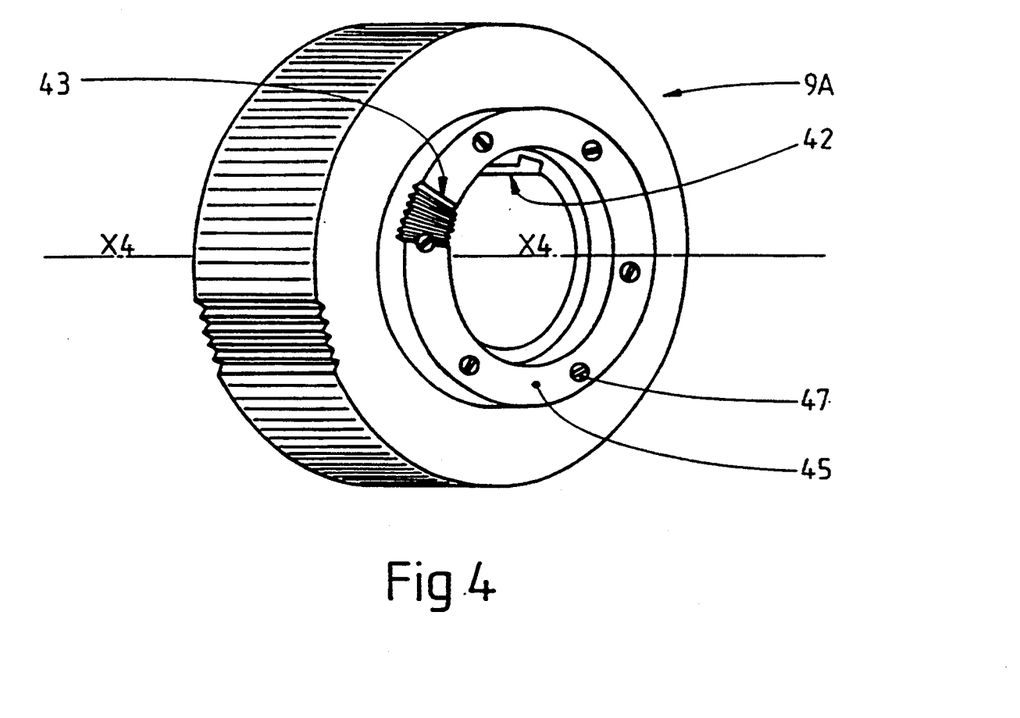
FIG. 4 A view of a milling wheel of the apparatus according to the invention having a special means for angular keying on the wheel-holding shaft.
Figure 5:
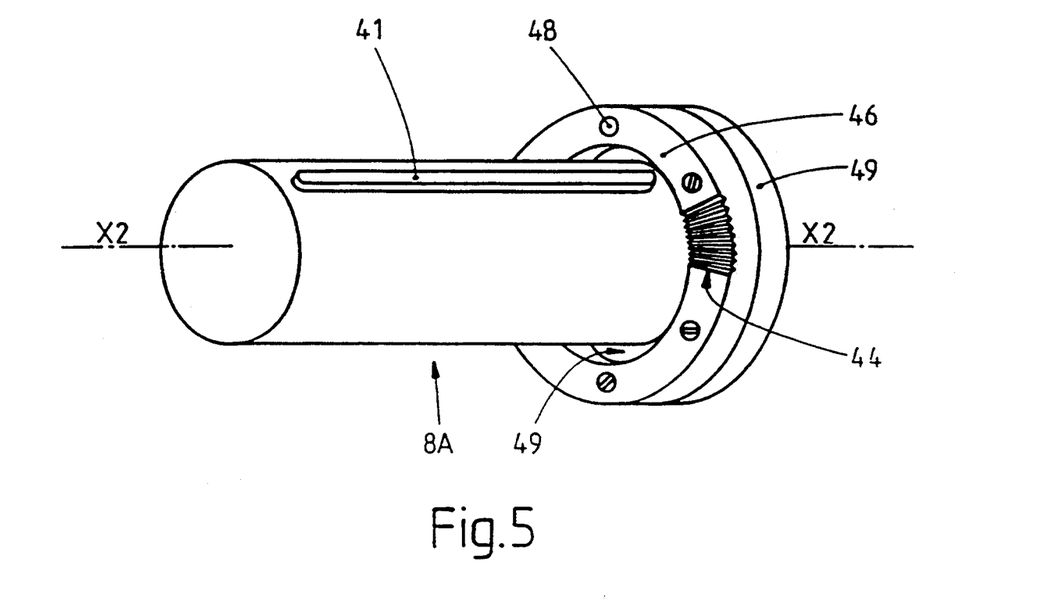
FIG. 5 A view of the milling wheel-holding shaft suitable for receiving the wheel of FIG. 4.

In order to form accurate profiles on the parts, it is necessary to reduce to a minimum the clearance of the clearing surfaces and transmissions and in particular the rotation clearance between the milling wheels and the shafts carrying them. FIGS. 4 and 5 show a special embodiment of the connection between the shaft and the milling wheel making it possible to obtain a very accurate, reproducible angular keying of each wheel on the shaft driving it. As shown in FIGS. 4 and 5, each wheel such as 9A is provided on its periphery with a plurality of teeth or grooves, the two terms being equivalent. This wheel is drilled to a diameter permitting its engagement around the wheel-holding shaft 8A with the minimum clearance necessary to enable it to be slid up to its location. This shaft has a fixed pin 41 used for the fitting of milling wheels of a particular type, such as those for producing threads not requiring such a pronounced angular precision.

The milling wheel 9A has a pin passage 42 with an adequate clearance to enable the presence of the pin 41 not to form an obstacle to the very accurate angular keying produced by means of the front grooves or teeth 43, 44 of the rings or bushes 45, 46. The edges of these teeth or grooves are located in radial planes containing the axis of the bush and arranged in ring-like manner on a front face of each bush 45, 46 perpendicular to its axis. The bush 45 is accurately fixed to the milling wheel 9A by a series of screws such as 47, so that its axis coincides with the axis of the milling wheel X4—X4. The second bush 46, identical to the first, is fixed by a series of screws such as 48 on a shoulder 49 of the wheel-holding shaft 8A, so that its axis coincides with said wheel-holding shaft axis X2—X2. The maintenance of engagement between the two front tooth systems 43, 44 is obtained by exerting on the milling wheel 9A an axial thrust in the direction of the bush 46 integral with the shaft 8A by an appropriate, not shown means, such as a sleeve, which can e.g. be screwed to the shaft.

Figure 6:
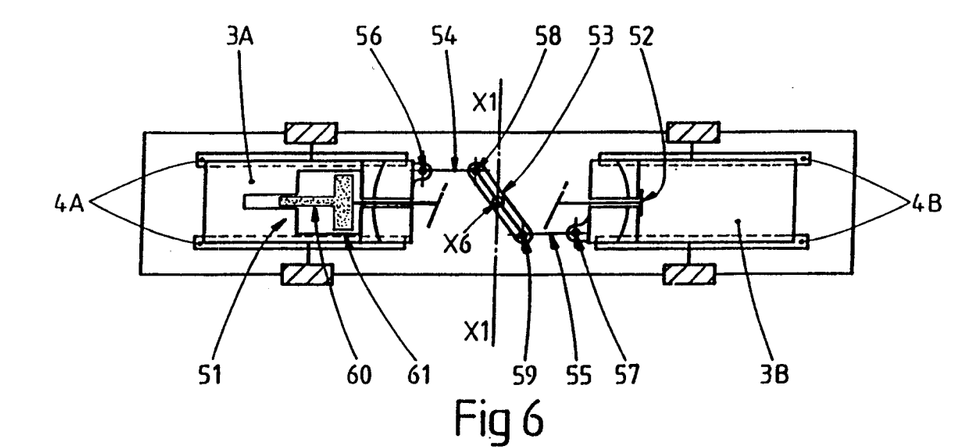
FIG. 6 A plan view of a symmetrical advance means used for operating the milling wheel-holding carriages of the apparatus according to the invention in the retracted position.
Figure 7:
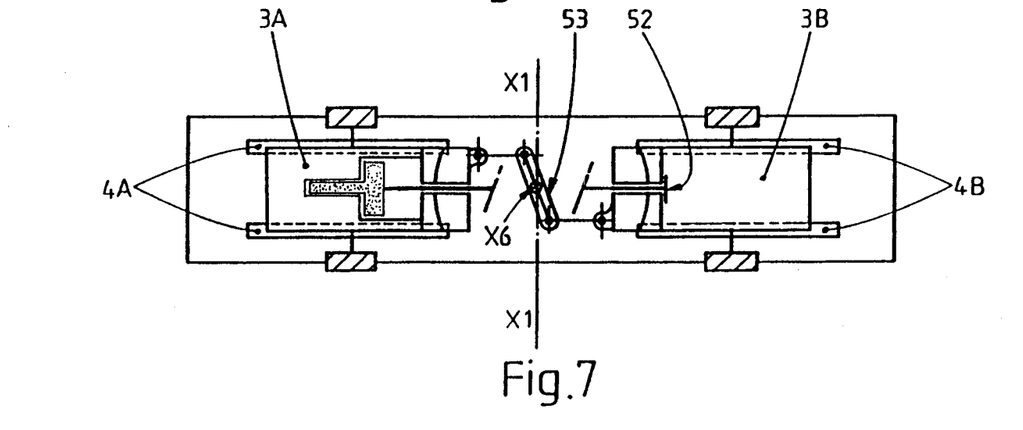
FIG. 7 A view of the apparatus of FIG. 6 in the advance position

The symmetrical displacement of the carriages 3A, 3B on the slides 4A, 4B is obtained by means of a hydraulic jack positioned below the carriages. The cylinder of the jack is integral with one of the two carriages and the piston rod acts directly or indirectly on the other.

FIGS. 6 and 7 purely diagrammatically show a drive procedure permitting a symmetrical advance of the two carriages 3A, 3B which carry, by means of bearings, the not shown wheel-holding shafts of axis X2—X2 and X3—X3, with respect to the axis X1—X1 of the shaft holding the part to be formed.

FIGS. 6 and 7 show the jack 51 integral with the carriage 3A, whereof the end of the piston rod 52 is integral with the carriage 3B. A rigid rocking beam 53 rotates about a pivot having a vertical axis X6 and which intersects the axis X1—X1. Two rigid arms 54, 55 are connected by vertically axed pivots 56, 57 to the ends of the carriages 3A, 3B by one of their ends and by the other to the rocking beam at 58 and 59. This fundamentally known arrangement permits a symmetrical displacement of the two carriages 3A, 3B on the slides 4A, 4B.

Moreover, not shown abutment means having an electrohydraulic servovalve make it possible to control the advance movement of the carriages up to the final level in an accurate manner. As shown in FIGS. 6 and 7, the jack has a reduced section piston 60, which permits a rapid return to the spaced position of the two carriages. This piston 60 is located in the extension of the high pressure piston 61 ensuring the advance. The piston 60 could be replaced by a small section return jack separate from the jack 51 ensuring the moving together of the two carriages 3A, 3B.

The example of producing a gear pinion with straight teeth using the aforementioned apparatus will now be given. Use is made of a steel part to be formed, with a revolving wall having a diameter of 32 mm and a pair of forming milling wheels with a diameter of 240 mm and a width of 45 mm. These wheels have a straight tooth system with 225 teeth in developing module 1.058 pressure angle 37°30.

The milling wheel-holding shafts are driven at a constant speed $V_m$ of 20 r.p.m. and the constant speed $V_p$ of the part-holding shaft is regulated to 150 r.p.m. in accordance with the relation $V_p = V_m \cdot N_1/N_2$ in order to form 30 teeth on the circumference of the part. There is a rolling time of 8 to 10 seconds between the time of coming into contact between the wheels and the part and that where, after stopping the advance of the carriages carrying the milling wheel-holding shafts and after disengaging the drive from the part, said carriages are brought to their starting position. This is followed by the measurement on the part of each of the 30 readings of teeth grouped in sevens and it is found that the difference between the maximum and minimum readings does not exceed 0.05 mm, whereas the standard variation on the conventional machine is 0.10 mm.

According to a special embodiment of the invention, the part-holding shaft 5 driving the part to be formed 7 and the motor means 71, 72, as well as the transmission means 73 located above said part-holding shaft (cf. FIG. 8), are fixed to a gantry 81 (cf. FIG. 9) mounted on the basic structure 2 of the apparatus. This gantry, whereof only the front part is shown, has two uprights 82, 83. A second part of the gantry having an identical structure is located to the rear beyond the carriages 3A, 3B. The upright 83 is fixed, whereas the upright 82 is articulated about an axis X7 parallel to the axis X1 of the part-holding shaft 5. This axis X7 is mounted on a bearing fixed to the basic structure 2. A jack 84 bearing on the basic structure 2 and articulated to the upright 82 at point 85 makes it possible to rotate the latter about X7, thus freeing the assembly comprising the part-holding shaft 5, the part to be formed 7 and the motor and transmission means 71, 72, 73.

Figure 9:
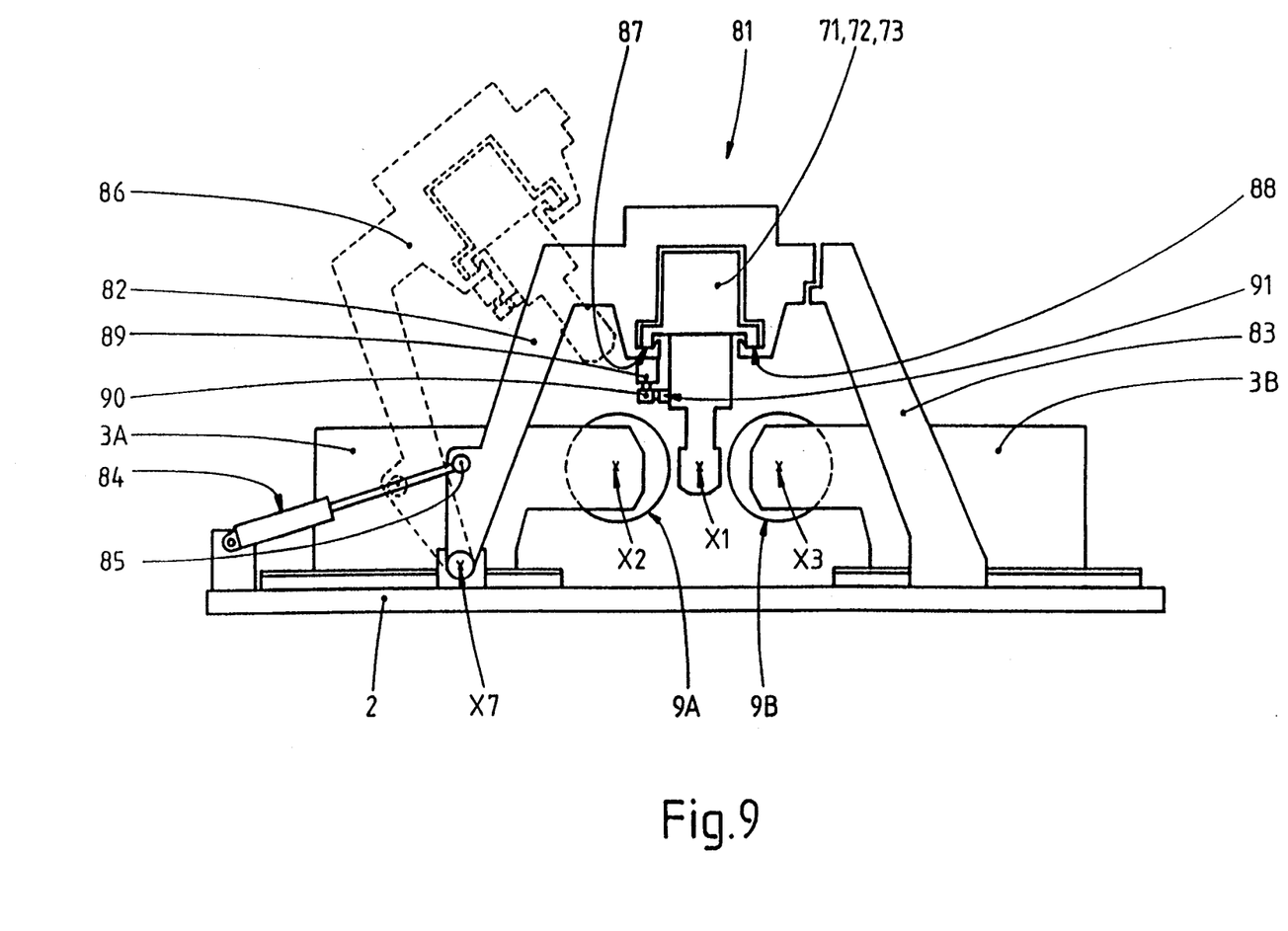
FIG. 9 In elevation a tilting gantry according to the invention making it possible to raise the part-holding shaft and its drive means.

In broken line form at 86 is shown the gantry upright 82 in an inclined position by pulling by means of the jack, to which are connected the part-holding shaft 5 and its drive means 71, 72, 73.

It can also be seen that the gantry 81 has slides 87, 88, which make it possible to slide the assembly constituted by the shaft 5 and the motor and transmission means 71, 72, 73 along the axis X1—X1. A hydraulic motor 89 meshing by a pinion 90 on a rack 91 makes it possible to perform said sliding action. It is thus possible to form parts by combining the rotary movement of the forming milling wheels 9A, 9B with the sliding of the part to be formed 7 along the axis X1—X1 by the aforementioned successive working method.

Numerous modifications can be made to the apparatus and the process according to the invention without passing outside the scope thereof.

We claim:

1. An apparatus for cold forming grooves or teeth on a revolving wall of a part, comprising:
   two forming milling wheels having identical teeth or grooves and a constant profile, said wheels being located on opposite sides of the part;
   support shafts having keys and mounting said wheels such that axes of said wheels are symmetrical with respect to the revolving axis of the part;
   carriages supporting each of said support shafts, each of said carriages being mounted for movement in a direction transverse to the axis of the part;
   means for displacing said carriages in said transverse direction such that said wheels can be moved toward the part to penetrate the part to a predetermined depth;
   synchronization means associated with said carriages for keeping said wheels equidistant from the part;
   wheel drive means for driving said wheels at the same rotational position and speed, comprising:
   a) at least one motor,
   b) an adjustment differential receiving an output of said motor and having control means for adjusting an angular difference between the motor output and an output of the differential,
   c) first and second articulated shafts respectively connecting each of said support shafts to one of the output of the motor and the output of the differential, wherein an angular difference between said articulated shafts can be adjusted by said differential,
   d) means for braking each of said support shafts, and
   e) means including meshing ring gears on each of said wheels and support shafts for precisely angularly fixing each of said wheels on the respective support shaft; and
   part drive means for driving said part at an instantaneous rotational speed VP such that $V_p = V_m \cdot N1/N2$, wherein Vm is the instantaneous rotational speed of each of said wheels, N1 is the number of teeth or grooves of each wheel and N2 is the number of grooves or teeth to be formed on the part.

2. Device according to claim 1, wherein said means for displacing said carriages comprise at least one hydraulic cylinder.

3. Device according to claim 1, wherein said synchronization means comprise a rocking beam mounted on a pivot axis and having opposite ends respectively connected with said carriages.

4. Device according to claim 1, wherein said meshing ring gears each have radial grooves or teeth.

5. Device according to claim 1, wherein said articulated shafts are each telescopic.

6. Device according to claim 1, wherein the output of said motor includes a reduction gear unit and the output of said adjustment differential includes another reduction gear unit.

7. Device according to claim 1, wherein said part drive means comprise a part drive motor, a speed reducer connected to the output of the part drive motor and a transmission connected between the speed reducer and a shaft supporting the part.

8. Device according to claim 7 including a structure having a gantry and supporting said part drive motor and said speed reducer.

9. Device according to claim 8, wherein said gantry is hinged so as to be moveable for selectively positioning the part between said wheels.

10. Device according to claim 1 including means for supporting said part so as to be moveable along its axis.

11. Device according to claim 9 including means for supporting said part so as to be moveable along its axis.

12. Device according to claim 11, wherein said means for mounting the part for movement along its axis comprises slides on the gantry, a part carrying shaft being mounted to said gantry via said slides.

13. A process for cold forming grooves or teeth on a revolving wall of a part using an apparatus including two forming mill wheels having identical teeth or grooves and a constant profile, said wheels being located on opposite sides of the part; support shafts having keys and mounting said wheels such that the axes of said wheels are symmetrical with respect to the revolving axis of the part; carriages supporting each of said support shafts, each of said carriages being mounted for movement in a direction transverse to the axis of the part; means for displacing said carriage in said transverse direction such that said wheels can be moved toward the part to penetrate the part to a predetermined depth; synchronization means associated with said carriages for keeping said wheels equidistant from the part; wheel drive means for driving said wheels at the same rotational position and speed, comprising at least one motor, an adjustment differential receiving an output of said motor and having control means for adjusting an angular difference between the motor output and an output of the differential, first and second articulated shafts respectively connecting each of said support shafts to one of the output of the motor and the output of the differential, means for braking each of said support shafts, and means including meshing ring gears on each of said wheels and support shafts for precisely angularly fixing each of said wheels on the respective support shaft; and part drive means for driving said part, said method comprising the steps of:

using the braking means and the means for precisely angularly fixing to take up play in said wheel drive means; angularly adjusting the two roller carrying shafts in relation to one another using the adjustment differential;

moving the support shafts toward one another and toward the axis of the part until grooves or teeth of the rollers are put in contact with the wall of the part to penetrate into the wall of the part to a predetermine depth; and regulating the speed of rotation of the wheels and part such that an instantaneous velocity $V_p$ of the part equals $V_m \cdot N1/N2$, wherein $V_m$ is the instantaneous rotational speed of each of the wheels, N1 is the number of teeth or grooves of each wheel and N2 is the number of teeth or grooves to be formed on the part.

14. Process of claim 13, wherein the instantaneous speeds $V_p$ and $V_m$ are constant during the penetrating step.

15. Process according to claim 13, wherein during the penetrating step, the part rotating at speed $V_p$ is moved along its axis of revolution.

16. Process according to claim 13, wherein the parts are formed from blanks having a annular shoulder.

17. Process according to claim 16, wherein the annular shoulder defines a radial excess thickness of between 0.2 and 0.7 mm, and has a total axial extension of between 1 and 5 mm.

* * * * *